(12) United States Patent
Ghatak et al.

(10) Patent No.: US 10,467,816 B2
(45) Date of Patent: Nov. 5, 2019

(54) MIXED REALITY OBJECTS

(71) Applicant: Microsoft Technology Licensing, LLC, Redmond, WA (US)

(72) Inventors: Kausik Ghatak, Bengaluru (IN); Janani Varadharajan, San Jose, CA (US); Swapnil M. Potey, Bengaluru (IN); Eatesh Kandpal, Bengaluru (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 16 days.

(21) Appl. No.: 15/934,653

(22) Filed: Mar. 23, 2018

(65) Prior Publication Data

US 2019/0295320 A1      Sep. 26, 2019

(51) Int. Cl.
| | |
|---|---|
| *G06T 19/00* | (2011.01) |
| *G06T 19/20* | (2011.01) |
| *G02B 27/01* | (2006.01) |
| *G06K 9/00* | (2006.01) |
| *G06F 16/432* | (2019.01) |

(52) U.S. Cl.
CPC .......... *G06T 19/006* (2013.01); *G02B 27/017* (2013.01); *G06F 16/434* (2019.01); *G06K 9/00671* (2013.01); *G06T 19/20* (2013.01)

(58) Field of Classification Search
CPC ..... G06T 19/006; G06T 19/20; G06F 16/434; G02B 27/017
See application file for complete search history.

(56) References Cited

U.S. PATENT DOCUMENTS

| | | | |
|---|---|---|---|
| 8,896,628 B2 * | 11/2014 | Suto | G09G 5/00 345/633 |
| 9,292,085 B2 | 3/2016 | Bennett et al. | |
| 9,384,594 B2 * | 7/2016 | Maciocci | G06F 3/011 |
| 9,870,624 B1 * | 1/2018 | Narang | G06T 7/521 |

(Continued)

OTHER PUBLICATIONS

Jin, et al., "ARMO: Augmented Reality based Reconfigurable MOck-up", In Proceedings of the 6th IEEE and ACM International Symposium on Mixed and Augmented Reality, Jun. 6, 2008, 2 Pages.

(Continued)

*Primary Examiner* — Ryan R Yang
(74) *Attorney, Agent, or Firm* — Alleman Hall Creasman & Tuttle LLP

(57) ABSTRACT

Examples are disclosed herein that relate to mixed reality objects. One example provides a computing device comprising a logic machine and a storage machine holding instructions executable by the logic machine to execute a mixed reality application, the mixed reality application defining a third-party object slot, present a mixed reality environment, and upon detecting a condition associated with the third-p arty object slot, send to a remote computing system a request to fill the third-party object slot, the request based on sensing of a real-world portion of the mixed reality environment with a sensor of the computing device. The instructions are further executable to receive a third-party object from the remote computing system selected by the remote computing system based on the request, and display the third-party object in the third-party object slot such that the third-party object is constrained by a real-world portion of the mixed reality environment.

20 Claims, 9 Drawing Sheets

(56) References Cited

U.S. PATENT DOCUMENTS

| | | | |
|---|---|---|---|
| 10,290,152 B2* | 5/2019 | Schwarz | G06F 3/011 |
| 2012/0195460 A1 | 8/2012 | Lawrence Ashok Inigo | |
| 2012/0249741 A1* | 10/2012 | Maciocci | G06F 3/011 |
| | | | 348/46 |
| 2013/0044128 A1* | 2/2013 | Liu | G09G 5/00 |
| | | | 345/633 |
| 2014/0063060 A1 | 3/2014 | Maciocci et al. | |
| 2015/0123966 A1* | 5/2015 | Newman | G06T 19/006 |
| | | | 345/419 |
| 2016/0155270 A1* | 6/2016 | Poulos | G06T 19/006 |
| | | | 345/633 |
| 2016/0379408 A1 | 12/2016 | Wright et al. | |
| 2017/0169610 A1 | 6/2017 | King | |
| 2017/0277253 A1 | 9/2017 | Mullen | |
| 2019/0035125 A1* | 1/2019 | Bellows | G02B 27/017 |

OTHER PUBLICATIONS

"International Search Report and Written Opinion Issued in PCT Application No. PCT/US2019/021957", dated May 29, 2019, 17 pages.

* cited by examiner

MIXED REALITY OBJECTS

BACKGROUND

A software application may integrate content produced by an entity other than a developer of the application. As examples, a videogame application may support modifications that adjust the appearance of in-game objects, while a productivity application may support plug-ins that extend application functionality.

DETAILED DESCRIPTION

Figure 1A:
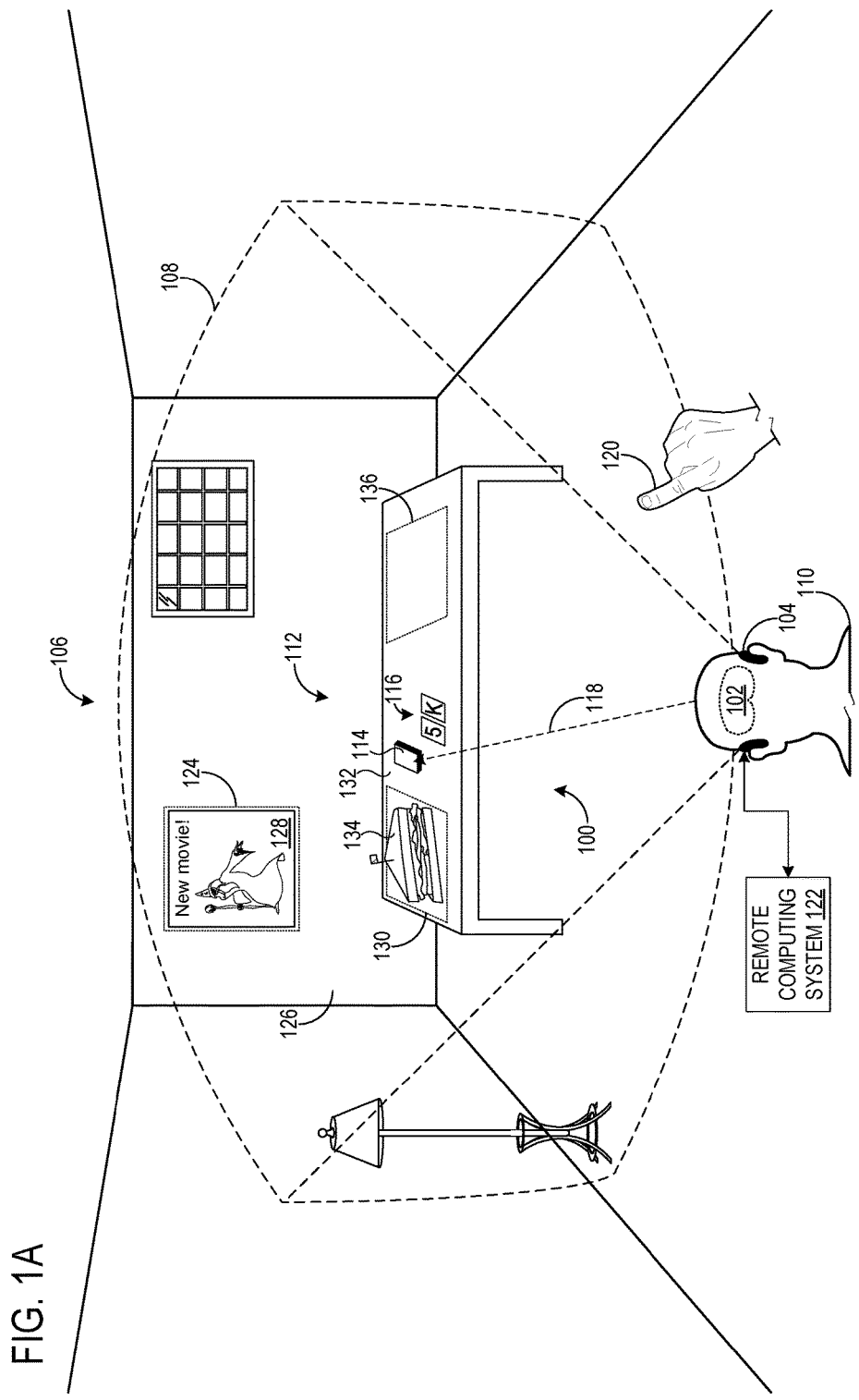
FIGS. 1A-1C show an example mixed reality environment.

As mentioned above, a software application may integrate content produced by an entity other than a developer of the application. As examples, a videogame application may support modifications that adjust the appearance of in-game objects, while a productivity application may support plug-ins that extend application functionality.

The integration of content from different creators and sources in a common software application is desired as new types of software applications and computing experiences are developed. Mixed reality (MR) is one such emerging computing experience, in which real imagery of a physical environment is combined with virtual imagery rendered by a computing device to visually augment the physical environment and enhance the range of possible user experiences. A typical MR application places great emphasis on providing virtual imagery that is commensurate with the physical environment in which it is displayed—for example, the application may attempt to render a virtual object with a convincing life-like appearance, as if the object were a real object occupying the physical environment.

In contrast, existing systems for integrating externally-developed content into software applications do not adapt to the physical environment in which the content is viewed. One such system may integrate external content into a virtual environment rendered by a computing device, which, by rendering the environment, can make information about a virtual object's position, appearance, behavior, as well as other data regarding the virtual environment, readily and easily available to the external content integration process. Unlike as in MR contexts, the computing device need not analyze a physical environment, much less adapt external content to it. These and other systems may be poorly suited for MR applications, providing content that is unreflective of physical reality, disruptive to the user experience, and distracting.

In view of the issues described above, implementations are disclosed herein for displaying third-party objects in an MR application that are selected based on sensing a real-world portion of an MR environment. As described below, an object selected based on the real-world portion may also be displayed such that it is constrained by real-world portions of the MR environment. Such selection and constraint may facilitate the display of virtual objects whose appearance and behavior are consistent with a physical environment they appear to occupy, and so that the objects are non-disruptive to the user experience and align with a user's expectations regarding how realistic objects should behave in an MR environment.

Objects displayed by a computing device may be received from, and selected by, a remote computing system based on a request from the computing device. This may relieve the computing device of the computational expense associated with maintaining and providing objects. Being based on sensing of a real-world portion of an MR environment, the request supports the selection of objects well-suited to the MR environment, and allows the computing device and local MR software/systems to be relatively specific or unspecific about an object to be displayed. Similarly, the specificity with which an MR application developer provides input about the objects to be displayed in the application may vary, enabling developer customization of object display without requiring significant input from the developer. The approaches described herein may enable various advantages for the developer, creator/provider of third-party objects, and/or end users of the MR application, including but not limited to extensions and modifications of application functionality, end user and third-party content creation and influence in MR experiences, and MR application monetization and revenue generation for the developer.

Figure 1B:
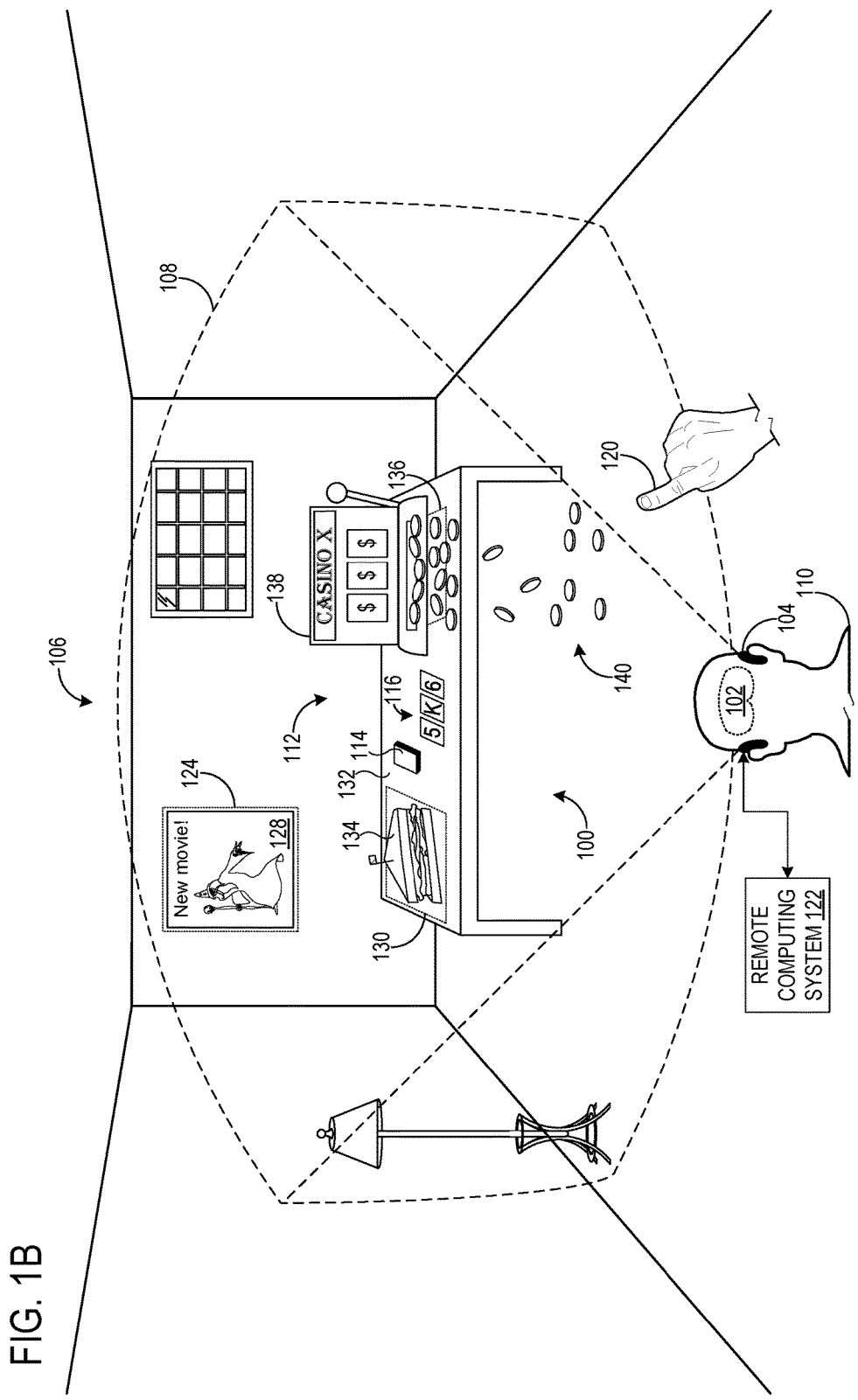
Figure 1C:
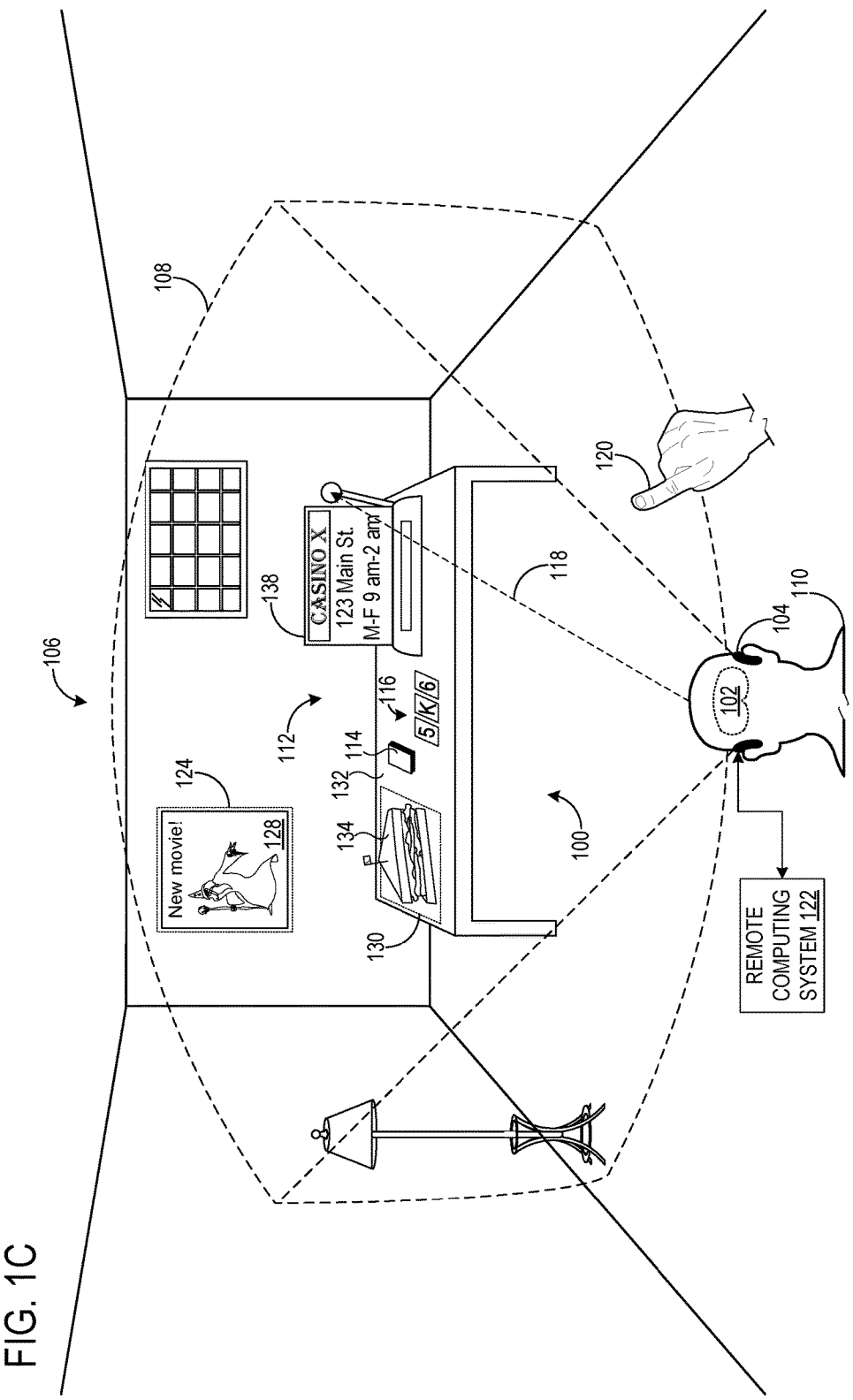

FIGS. 1A-1C show an example MR environment 100 presented on a display device 102 of a computing device, which is shown in the form of a head-mounted display (HMD) device 104. Display device 102 is at least partially transmissive, allowing real imagery corresponding to a physical environment 106 to be composited with virtual imagery rendered on the display device, thereby forming MR environment 100 within a field-of-view (FoV) 108 of the display device. FoV 108 may be less than, greater than, or substantially coextensive with an FoV of a user 110 of HMD device 104. While shown as a home environment, physical environment 106 may assume any suitable form (e.g., industrial, educational, commercial). Similarly, the computing device may assume any suitable form, including that of a non-head-mounted device (e.g., a head-up display).

HMD device 104 presents MR environment 100 in the course of executing an MR application 112. In the depicted example, MR application 112 involves a virtual card game in which virtual cards are drawn from a virtual deck 114 into a player hand 116. As shown, user 110 may draw cards from deck 114 by directing a gaze direction 118 toward the deck and performing a gesture with a hand 120. Any suitable type of user input(s) may be used to control MR application 112, however. Example computing hardware that may be used to execute MR application 112 and receive user input is described below with reference to FIGS. 6 and 8.

MR application 112 defines one or more slots in which third-party objects are displayed in the MR application. Generally, a slot provides a vacancy that can be filled by a third-party object, and may stipulate at least some of the condition(s) in which the third-party object is displayed. "Third-party object" as used herein may refer to an object that is not inherent to MR application 112—that is, the MR application may not include the object during development, distribution, and/or when initially installed on HMD device 104. Instead, under select conditions MR application 112 may send a request to fill a slot with a third-party object to a remote computing system 122, which identifies a third-party object suitable for the slot based on the request. The third-party object may be received from remote computing system 122 and displayed on display device 102 in MR environment 100 during execution of MR application 112.

The developer of MR application 112 may opt to integrate third-party objects via slots for a variety of purposes. For example, third-party object integration may enable extensions/modifications to the functionality inherently provided by MR application 112. In some examples, third-party object integration may enhance or otherwise adjust the appearance of virtual objects in MR application 112—e.g., third-party objects may enable cosmetic modification of virtual avatars and other characters, or, in another example, objects may stylize, enhance, or otherwise modify the manner in which MR environment 100 is rendered. Third-party objects may be created by end users, enabling user-driven content creation and influence of MR application 112, for example. Third-party object integration may enable MR application 112 to be updated over time (e.g., to reflect current events, changes to circumstances related to user 110). Further, third-party object integration may enable multiplayer and collaborative MR experiences in which third-party objects represent a different user or entity, content from a network or multiplayer service provider or backend, etc.

Third-party object integration may serve other purposes for other types of MR applications; for an educational MR application, third-party objects may enable the inclusion of educational material developed by third-parties; for an MR application used to carry out industrial and/or commercial activities such as device maintenance, third-party objects may enable the inclusion of instructional and reference material; for an MR application used to carry out surgery, third-party object may enable the inclusion of anatomical information and patient data. In other examples, third-party objects may represent advertisements whose integration in MR application 112 facilitate the provision of rewards (e.g., payments) to the developer. This may enable the developer to monetize MR application 112 without implementing a monetization scheme itself.

In these and other examples, the MR developer may be a different entity than a creator of one or more integrated third-party objects and/or an owner of remote computing system 122—for example, object integration may be implemented as a service to which the developer subscribes. Offloading third-party object integration onto remote computing system 122 in these ways may relieve HMD device 104 of the computational expense associated with maintaining and identifying third-p arty objects well-suited for MR application 112.

FIGS. 1A-1B show various example slots and example third-party objects. For example, MR application 112 may define a slot 124 to be filled with a third-party object for a wall of a physical environment. Upon detecting a wall 126 of physical environment 106 (e.g., via one or more outward-facing image sensors of HMD device 104), the HMD device sends a request to fill slot 124 to remote computing system 122, which responds with a poster 128 determined to be generally suitable for a physical wall. As another example, MR application 112 may define a slot 130 for a table surface in a physical environment. Upon detecting a table surface 132 in physical environment 106, the HMD device sends a request to fill slot 130 to remote computing system 122, which responds with a food item 134 determined to be generally suitable for a table surface. As described below with reference to FIG. 5, receiving a third-party object may include receiving a variety of different types of data enabling its display.

In these examples, the requests sent by HMD device 104 to fill slots 124 and 130 may specify a type of physical feature—e.g., a wall and table surface, respectively—without specifying a specific surface or physical parameters of the specific surface for which to fill a slot. As described in further detail below, the level of specificity associated with a request may vary, as may how specifically a slot is defined by the developer of the MR application. In some examples, the developer may not identify definite positions of slots 124 and 130, and instead may merely specify that third-party objects are to be displayed when a physical wall and table top are detected, respectively. Additional detail regarding the content of third-party slots is described below with reference to FIG. 3. While the slots described herein are graphically represented in FIGS. 1A-1B for clarity, display device 102 may display third-party objects without displaying their corresponding slots.

HMD device 104 may send requests to fill a slot upon detecting a condition associated with the slot. MR application 112 may define the condition, for example. For slots 124 and 130, respective conditions may include detecting a wall and a table top in a physical environment. Further, a condition may be triggered by user interaction with MR application 112. FIGS. 1A-1B illustrate a condition associated with a slot 136, where the condition is triggered by user interaction with the virtual card game played as part of MR application 112. This condition is defined such that slot 136 is filled upon user 110 successfully achieving a hand totaling twenty-one. In FIG. 1A, hand 116 totals fifteen, with user 110 drawing another card from deck 114. In FIG. 1B, the newly drawn card brings hand 116 to a total of twenty-one, causing slot 136 to be filled with a virtual slot machine 138.

HMD device 104 may display a third-party object as being constrained by a real-world portion of MR environment 100. As one example of such constraint, FIG. 1B shows slot machine 138 dispensing a plurality of coins 140 that are each displayed as interacting with gravity and/or table surface 132. Some coins may realistically collide, bounce/roll, and realistically come to rest on surface 132, while others may fall off the surface and accelerate toward the floor of MR environment 100 at approximately −9.81 m/s^2. Further, third-party objects 128 and 134 may be constrained by real-world portions of MR environment via their placement on wall 126 and surface 132, respectively. Still further, other types of real-world constraints are possible. For example, HMD device 104 may output audio (e.g., via an integrated and/or remote speaker) that acoustically represents collisions among the plurality of coins 140 and surface 132 and/or the floor of MR environment 100. In this way, the plurality of coins 140 may be acoustically as well as physically constrained by real-world portions of MR environment 100. MR application 112 may implement any suitable type of physical constraint for a third-party object, however, additional examples of which are described below with reference to FIGS. 2A-2D. As described below with reference to FIG. 6, HMD device 104 may utilize one or more sensors to sense real-world aspects of MR environment 100 (e.g., to discern the presence of physical objects, their identity, configuration, behavior, and/or other data), where output from the sensor(s) may be used to constrain third-party objects based on the sensed real-world aspects.

A third-party object may be interactive. As one example, FIG. 1C shows a user input directed to virtual slot machine 138 in the form of user 110 directing gaze direction 118 toward the slot machine. In response to this gaze intersection, HMD device 104 may control display of virtual slot machine 138 by rendering information on the slot machine regarding a casino local to user 110. In this example, slot machine 138 represents the local casino, and provides potential patronage through user interaction. A third-party object may be interactive in any suitable manner, however. As additional examples, interaction with poster 128 may cause display of a user interface of a digital storefront with which a movie represented by the poster can be purchased, and interaction with food item 134 may cause display of a user interface (e.g., of an internet browser) with which food can be ordered from a restaurant local to user 110. User interaction with third-p arty objects may include any suitable combination of user inputs, including but not limited to gaze, hand gestures, head gestures, body gestures, locomotion, voice commands, and input provided via a peripheral device.

A third-party object may be interactive for scenarios in which user interaction is not specifically directed to the object. A state of user 110, and/or a state of MR application 112, for example, may define interaction with a third-party object and effect a corresponding action. As specific examples, user 110 entering a particular location, going outdoors, being proximate to a particular physical object, and/or MR application 112 entering a particular mode of operation, may trigger third-party object display or a change in the manner in which an existing third-party object is displayed.

Remote computing system 122 may receive information about user interactions with third-party objects. In this case, HMD device 104 may identify a user interaction with a third-party object—such as the intersection of gaze direction 118 with slot machine 138, gestures performed by hand 120 directed to poster 128 or food item 134, user motion (e.g., as detected via an inertial measurement unit) toward a third-party object, and/or any other suitable type of user interaction—and send an indication of the interaction to remote computing system 122. Remote computing system 122 may then utilize the indication in various manners.

User interactions with a third-party object may be used in assessing the performance of the object in MR application 112. User interaction, as well as a lack of user interaction, may indicate how effective a third-party object is in attracting user attention, how commensurate the object is with a physical environment, whether the object is disruptive to or supportive of an MR application, and/or other potential information. In one example, remote computing system 122 may receive an indication of user interaction with a third-party object from HMD device 104, and select a future third-party object based on the indication. For example, indications of positive user interaction with an object may lead remote computing system 122 to select similar objects in the future, and in some cases to reuse the object. Indications of negative user interaction may conversely lead remoting computing system 122 to avoid reselecting the object and instead select future objects that differ in various manners.

HMD device 104 may indicate user interactions with third-party objects in various manners and with any suitable level of granularity. For example, HMD device 104 may provide indications that differentiate among different paradigms of user input—e.g., the HMD device may separately indicate a gesture input, a gaze input, a voice input, input provided via a peripheral input device coupled to the HMD device, biometrics of user 110, and/or other input types. More granular data may accompany indications, such as data indicating a gaze pattern (e.g., a time series of gaze positions), a time series of two or three-dimensional coordinates corresponding to hand 120, etc. Regardless of their form, indications reported by HMD device 104 may be used to determine positive, negative, and/or other levels of engagement with third-party objects. As examples, an indication of relatively sustained gaze on a third-party object (e.g., a minimum duration of gaze within an area that allows for saccadic movements), or relatively sustained gaze combined with a hand gesture or other input directed to an object, may be considered positive engagement with the object. Conversely, a relative lack of sustained gaze, or a relative sustained gaze that is not followed by a directed input, may be considered negative engagement with the object. In some examples, MR application 112 may support user inputs that explicitly indicate negative engagement —for example, user 110 may instruct HMD device 104 via a hand gesture and/or voice command to remove a third-party object from MR environment 100.

User interaction and information derived therefrom can be made available to the developer of MR application 112, enabling the developer to gain a sense of how third-party objects affect the user experience. Based on this feedback, the developer may adjust how third-party objects are integrated into MR application 112, for example by adjusting how third-party object slots are defined (e.g., via updates to the application). In this way, the developer may continually provide third-party content that is contextually relevant and appropriate, and may provide increasingly relevant content as user interaction information is made available. In some examples, remote computing system 122 may facilitate the provision of rewards to the developer based on indications of user interactions with third-party objects, and the developer may analyze user interaction information to determine how effectively objects monetize MR application 112. HMD device 104 itself may also consider feedback regarding user interaction to automatically, or as instructed by the developer of MR application, user 110 (e.g., via user settings), and/or remote computing system 122, affect third-party object display—e.g., by adjusting requests for third-party objects.

As described above, HMD device 104 may base requests to fill a third-party object slot on sensing a real-world portion of MR environment 100. In FIGS. 1A-1C, the requests to fill slots 124 and 130 are based on sensing the presence of a physical wall and table surface, respectively, as the slots are defined for these types of physical features. These requests may not include data regarding physical parameters of the wall and table surface detected by HMD device 104, but instead may generally (and implicitly) indicate that these physical features were detected by virtue of requesting third-party objects suitable for these physical features. However, in other examples HMD device 104 may send requests that do include data regarding detected physical parameters, such as sensor data collected by the HMD device.

FIGS. 2A-2D illustrate various real-world aspects of physical environments that HMD device 104 may sense, and that may help form a basis for requests to fill a third-party object slot and selection of third-party objects by remote computing system 122. While not represented in FIGS. 2A-2D, in each example HMD device 104 executes an MR application that defines slots for the third-party objects shown therein. At least some of the scenarios depicted in FIGS. 2A-2D illustrate how an MR application developer may define a third-party object slot without specifying a particular surface—or a type of surface in general. In this case, remote computing system 122 may provide a third-party object that is suitable for what a corresponding slot does specify, and, in some examples, HMD device 104 may at least partially control how the object is displayed (e.g., by identifying an unobtrusive location for display).

Figure 2A:
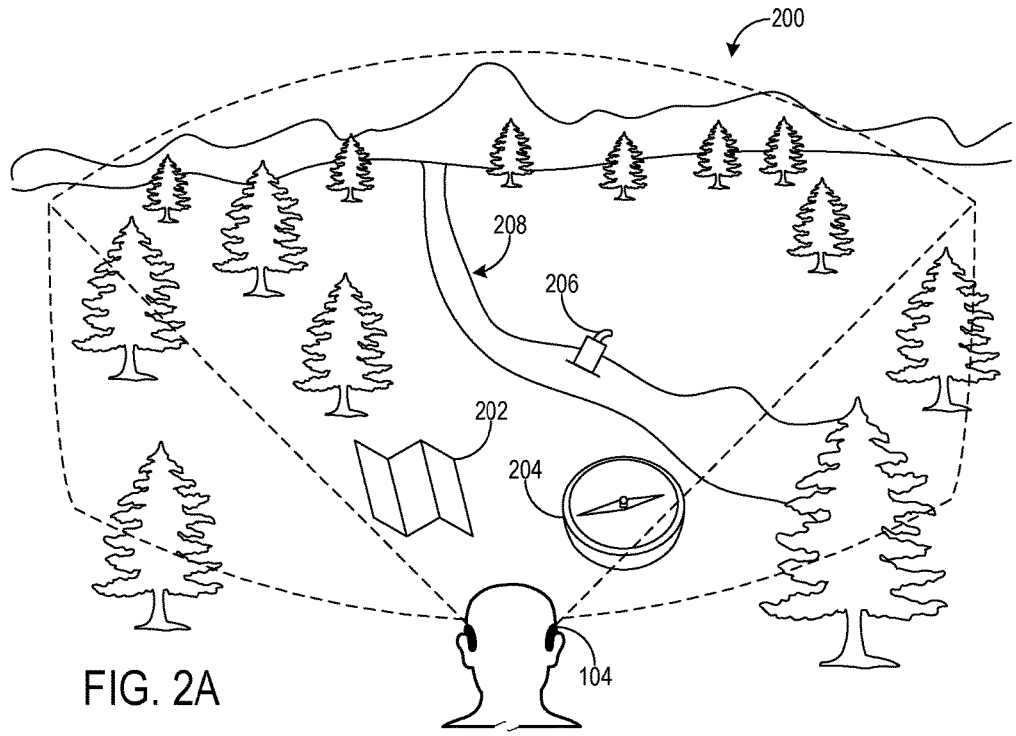
FIGS. 2A-2D illustrate various real-world aspects that may be sensed by the head-mounted display device of FIGS. 1A-1C.

In FIG. 2A, HMD device 104 occupies a physical environment 200 and determines its location within the physical environment, for example via a global positioning system (GPS) sensor. HMD device 104 sends this location in a request to fill a third-party object slot, and receives a map 202 in response. Map 202 is selected based on the sensed location of HMD device 104, and may be interactive to provide geographic information for an area corresponding to the sensed location.

In FIG. 2A, HMD device 104 also determines its orientation within environment 200, for example via an internal compass, and sends the orientation in a request to fill a third-party object slot. In response, a virtual compass 204 is received, and may be displayed with an orientation corresponding to that of HMD device 104. HMD device 104 may sense yet other aspects of environment 200, such as determining that the environment is an outdoor environment. HMD device 104 may identify various physical features in environment 200. To this end, FIG. 2A shows a third-party object in the form of a water filter 206 received in response to a request including data indicating a river 208 in environment 200. As further examples, a request may indicate the identity of river 208, in response to which a third-party object may be received representing a local watercraft rental service, a local business providing guided boating/fishing trips for the river, a local tourism agency, etc. In some examples, HMD device 104 may identify terrain and other features (e.g., city, mountain, river, lake) of a physical environment.

Figure 2B:
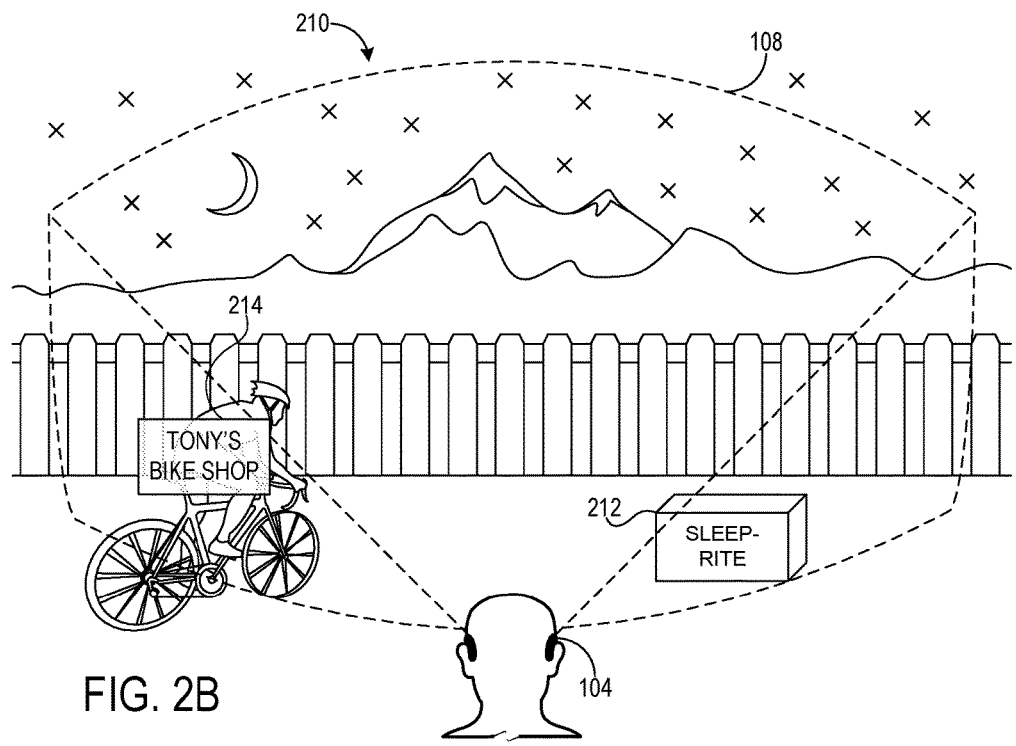

In FIG. 2B, HMD device 104 determines a current time of day (e.g., of a local time zone) in a physical environment 210 and sends the time in a request to fill a third-party object slot. In response, a third-party object in the form a sleep aid 212 is received that is selected based on the time. As further examples of third-party objects that may be provided based on local time, an object may be displayed representing a television or radio show being broadcast, local events underway or starting soon, a reminder for an upcoming appointment or deadline, events registered in a calendar application, a birthday or holiday, etc.

In some examples HMD device 104 may determine an identity of detected objects. In FIG. 2B, HMD device 104 determines that the identity of a detected object is that of a bicycle, and sends the identity in a request to fill a third-party object slot. In response, a billboard 214 is received that is selected based on the bicycle, and may be displayed as being attached to the bicycle as it moves throughout FoV 108.

Figure 2C:
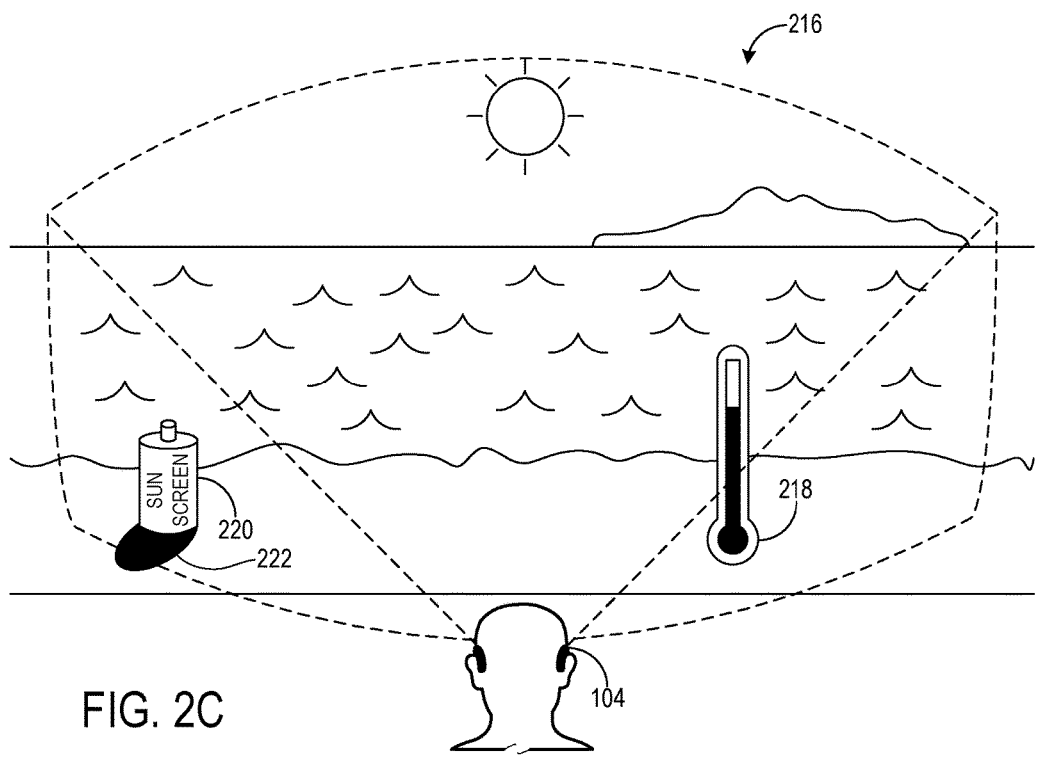

In FIG. 2C, HMD device 104 determines a temperature in a physical environment 216 and sends the temperature in a request to fill a third-party object slot. In response, a thermometer 218 is received that is selected based on the temperature, and is displayed with the temperature determined by HMD device 104. The display of thermometer 218 with the temperature determined by HMD device 104 is another example of how a third-party object may be constrained by a real-world portion of a physical environment. As further examples of third-party objects that may be provided based on temperature, an object may be displayed representing an appropriate clothing item (e.g., jacket, hat, shirt, pants, gloves, shoes), an air conditioning unit, a heater, a dehumidifier (where humidity may be sensed or otherwise indicated), a fan, a local climate control business, a de-icing agent, etc.

Also in FIG. 2C, HMD device 104 determines one or more weather conditions local to the HMD device and sends the weather condition(s) in a request to fill a third-party object slot. In response, a bottle 220 of sun screen is received that is selected based on the weather condition(s), which may indicate that use of sun screen is prudent in environment 216. As further examples of third-party objects that may be provided based on weather condition(s), an object may be displayed representing sunglasses, an umbrella, winter tires, cleats, a kite, a beachball, a frisbee, a vitamin D supplement, boots, etc.

FIG. 2C also depicts an example in which HMD device 104 determines one or more lighting conditions local to the HMD device and sends the lighting condition(s) in a request to fill a third-party object slot. In the depicted example, the lighting condition(s) are sent in the request that resulted in the display of bottle 220, which is also selected based on the lighting condition(s). This results in the display of bottle 220 with a shadow 222 corresponding to its position and orientation relative to that of the sun, yielding a realistic appearance of the bottle. The lighting condition(s) may indicate a direction of sunlight detected via one or more outward-facing image sensors, for example. In some examples, shadow 222 may be spatially fixed and retrieved along with bottle 220 (e.g., with a plurality of other shadows for other relative positions/orientations to the sun being associated with the bottle), while in other examples HMD device 104 may receive data for rendering a shadow that the HMD device can then use to display a shadow for the bottle that is appropriate for its relative position/orientation. The lighting condition(s) may indicate an ambient light level (e.g., detected via an ambient light sensor), a color temperature (e.g., detected via a color temperature sensor), an ultraviolet light level (e.g., detected via an ultraviolet light sensor), and/or any other suitable data. As further examples of third-party objects that may be provided based on lighting condition(s), an object may be displayed representing a lamp or other light source, a window shade, seasonal/holiday lights, glasses, contacts, infrared goggles, a sundial, etc.

HMD device 104 may determine any suitable local lighting condition(s) that may form a basis for selecting third-party objects. As further examples, HMD device 104 may sense one or more of light intensity, a frequency distribution of light, positions and/or orientations of one or more light sources, optical properties such as reflectance, transmittance, and/or albedo, and/or time-varying characteristics of light source(s).

Figure 2D:
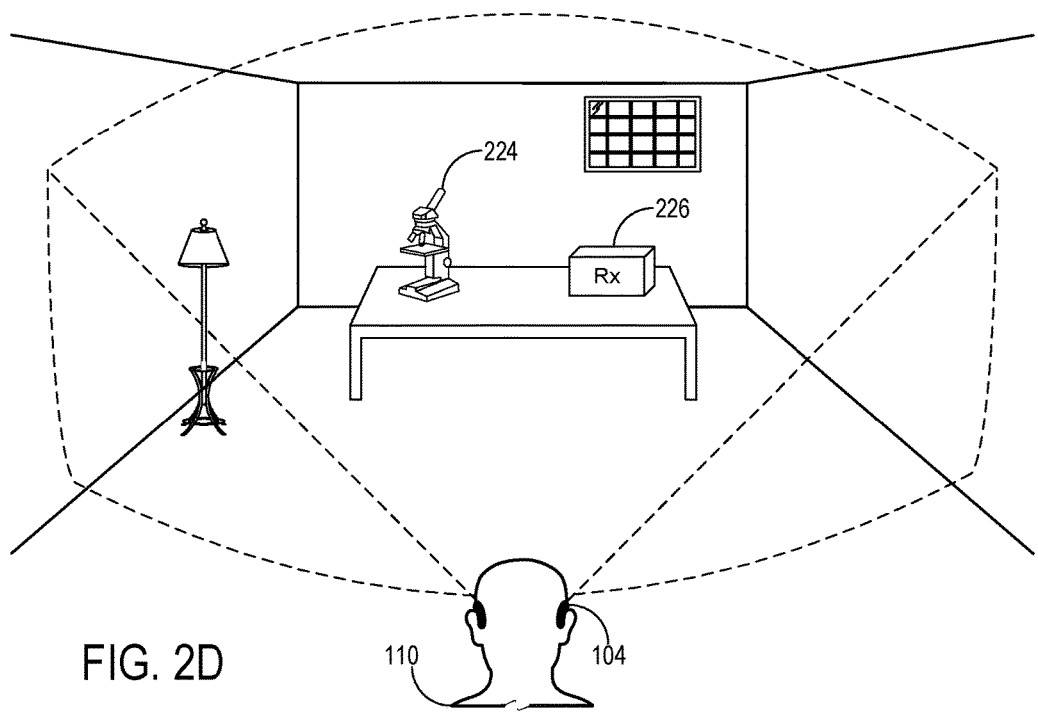

In some examples, HMD device 104 may send a request to fill a third-party object slot based on sensing data corresponding to user 110, and may receive a third-party object selected based on the user data. To this end, FIG. 2D illustrates how HMD device 104 has determined that user 110 has earned a degree in biology, and has sent data representing this degree in a request to fill a third-party object slot. In response, a microscope 224 is received that is selected based on the degree. HMD device 104 may determine any suitable biographic or other personalized data relating to user 110, including but not limited to age, gender, education level/background, income, religious affiliation, political affiliation, interests, hobbies, and employment. HMD device 104 may also collect biometric data relating to user 110. FIG. 2D depicts an example in which HMD device 104 collects (e.g., via an integrated or remote microphone) voice data of user 110, compares the voice data to previously-collected voice data of the user, and determines that the current speech from the user deviates form the previously-collected voice data in a manner that suggests the user has a cold. Data representing this potential condition is sent in a request for a third-party object, which arrives in the form of a medicine box 226. Any suitable biometric data may be analyzed by HMD device 104, including but not limited to heart rate, eye dilation, skeletal biometrics, gestural biometrics, facial expression, and blood pressure. As further examples of third-party objects that may be provided based on user-related data, an object may be displayed representing tickets for a sporting event, a political candidate, a local bank, a local financial advisor, an available loan, a local hobby group, a local job opening, etc.

As described above, a third-party object slot, request to fill a third-party object slot, and third-party object may vary with regard to their degrees of specificity. To illustrate this potential variance, and how these elements may differ in form, FIGS. 3-5 schematically show example configurations of a third-party object slot, request to fill a third-party object slot, and third-party object, respectively.

Figure 3:
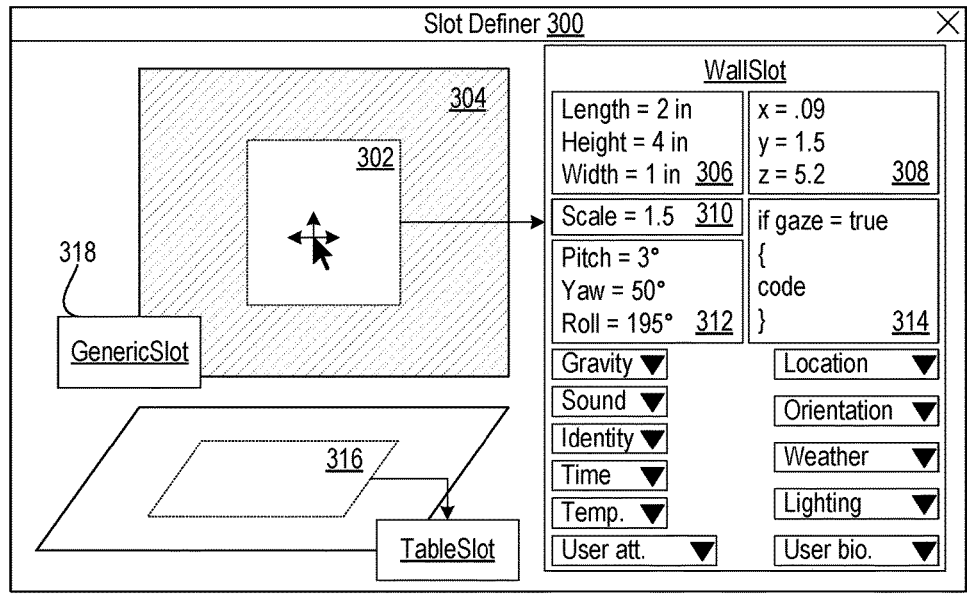
FIG. 3 shows an example software application in which third-party object slots can be defined.
Figures 4, 5:
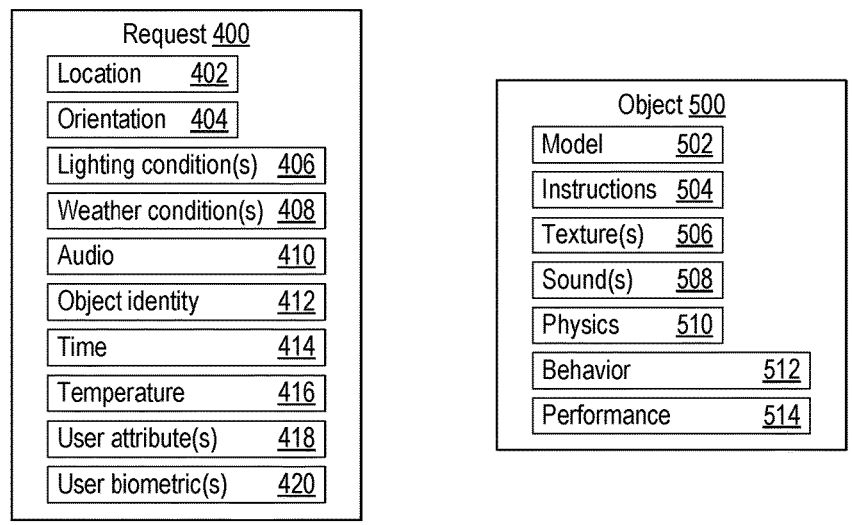
FIG. 4 illustrates various example parameters that may be included in a request to fill a third-party object slot.
FIG. 5 illustrates various potential data that may be received as part of a third-party object and/or associated with a slot for that object.

FIG. 3 shows an example software application 300 in which a developer of an MR application can define third-party object slots. The depicted example represents an approach in which a slot may be at least partially defined using a graphical user interface (GUI), while supporting other modes of definition, including text, code-based definition through a suitable programming or markup language, etc. A third-party object slot may be defined via any suitable combination of modalities, however. Further, while application 300 may be a dedicated application for defining third-party object slots, in other examples the application may offer other functionality (e.g., three-dimensional modeling). In yet other examples, at least a portion of the functionality provided by application 300 may be implemented as an add-in to another application—for example, this functionality may be provided as a plug-in or package imported into another application such as a software development kit (SDK) or an integrated development environment (IDE) for developing videogames and other applications.

Via the GUI of application 300, a user defines a slot 302 to be filled with a third-party object for a wall surface in a physical environment. Application 300 represents this physical feature with a virtual surface 304, allowing the user to visualize the placement of slot 302 without knowledge of the physical environment in which the slot will be filled.

FIG. 3 illustrates some of the potential attributes that may be specified for slot 302 and/or a third-party object inserted therein using application 300. Among these potential attributes for the object are dimensions 306, a three-dimensional location 308, a scale factor 310, and a rotational orientation 312. Code 314 may be added in a suitable language, which in some examples may be used to establish condition(s) in which slot 302 is filled (e.g., triggered by user interaction). FIG. 3 illustrates other attributes for the object, such as the nature of the object's interaction with gravity, and sound(s) to be played for the object (e.g., upon colliding with a physical surface). FIG. 3 also shows various conditions on which filling slot 302 may be contingent, such as an identity of a detected physical object that when determined at least in part causes display of the object, local time(s), a temperature range, a location, an orientation, weather condition(s), lighting condition(s), and/or data relating to a user of the device on which the third-party object is displayed, such as user attribute(s) (e.g., age, gender, education) and user biometric(s) (e.g., heart rate, pupil dilation).

FIG. 3 also shows a slot 316 defined using the GUI of application 300 for a table surface. From these examples, it will be understood how application 300 may be employed—graphically, via code, or any other suitable mechanism—to define slots for any suitable type of physical feature, identity or class of object, etc. As further examples of slots that may be defined based on a physical feature, a slot may be defined for the sky (e.g., as detected when outdoors), for different widths and types of roads (e.g., one slot for a range of thin roads including bike paths, another slot for a range of wider roads including highways), for urban areas, for rural areas, etc. Still further, FIG. 3 shows a slot 318 defined without respect to a physical feature. The creator of slot 318 may define the slot without specifying a physical feature, or a type of physical feature, for which to fill the slot. Instead, slot 318 may merely provide for the possibility of integrating a third-party object, which in some examples may be a so-called "generic" third-party object deemed suitable for slots that do not include physical feature definitions. Slot 318 supports the integration of third-party objects with minimal developer input, and in some examples may be filled with a third-party object whose display is controlled at least in part by the MR application that includes the slot—for example, the MR application may exert relatively more influence over the slot/object as compared to slots that do include physical feature definitions.

FIG. 4 illustrates various example parameters that may be included in a request 400 to fill a third-party object slot. Among these example parameters are a location 402 of a requesting device (e.g., HMD device 104), an orientation 404 of the requesting device, lighting condition(s) 406 local to the requesting device, weather condition(s) 408 local to the requesting device, audio 410 local to the requesting device, an identity 412 of an object detected by the requesting device, a time 414 local to the requesting device, a temperature 416 local to the requesting device, attribute(s) 418 of the user of the requesting device, and biometric(s) 420 of the user. In some examples, the requesting device may select the data included in request 400 according to how the corresponding slot is defined—e.g., the request may include data relating to aspects upon which the slot is defined/contingent.

In some implementations, the requesting device may form geometric representations of a physical environment. Thus, as described in more detail below, the requesting device may include or otherwise communicatively couple to one or more sensor(s), such as depth sensors, for gathering geometric data regarding the environment. In one example, the requesting device performs one or more of: acquiring point cloud data from a depth sensor (i.e., an array of distance values at x,y pixel locations), forming a surface reconstruction mesh comprising an array of polygons from the point cloud data, identifying major surfaces from the mesh, and associating one or more identified major surfaces in the environment with one or more corresponding definitions of the surfaces (e.g. "wall", "table surface") automatically or as directed for example via user input (e.g., a pointing gesture combined with a voice command identifying the major surface). In some examples, polygons of a surface reconstruction mapped to a surface may be resolved into a simpler representation comprising a reduced number of polygons. For example, the requesting device may resolve polygons mapped to a planar surface into a single rectangle representing the planar surface.

The above-described aspects produced by the requesting device in geometrically analyzing a physical environment may be included as data regarding one or more physical parameters of a physical feature included in a request to fill a third-party object slot. Thus, surface reconstruction data, point cloud data, polygonal data, as well as any other suitable physical parameter data including but not limited to location data (e.g., translational coordinates), orientation data (e.g., rotational coordinates), identity data, behavioral data, and time-varying data, may be included in a request and form an at least partial basis for selecting a third-party object.

FIG. 5 illustrates various potential data that may be received as part of a third-party object 500 sent in response to a request to fill a slot for the object. Object 500 may be sent to the requesting device of FIG. 4 from a remote computing system such as remote computing system 122 of FIG. 1.

Object 500 may include a model 502. Model 502 may be a two or three-dimensional model, and may include one or more geometric primitives, polygons, voxels, a point cloud, or any other suitable representation. Alternatively or additionally, object 500 may include instructions 504 which may help instruct a receiving device (e.g., HMD device 104) how to display the object. Instructions 504 may be a more abstract representation of object 500 than model 502—for example, the instructions may not directly represent the object as with the model, but nevertheless help instruct the receiving device how to display the object. In some examples, the receiving device may utilize locally stored data to display at least a portion of object 500 as specified by instructions 504.

Object 500 may include other data, such as texture(s) 506 (e.g., mapped to model 502), sound(s) 508 (e.g., to be played when colliding or otherwise physically interacting with physical surfaces and other features), physics data 510 (e.g., material properties) that helps specify how the object physically interacts with physical and/or virtual objects, behavioral data 512 (e.g., specifying how the object behaves in relation to other physical and virtual objects, how the object behaves when interacted with by a user), and performance data 514, which may enable the receiving device to provide and/or receive data about the performance of the object—e.g., the level of user engagement with the object, whether or not the object was disruptive to an MR experience. In some examples, performance data 514 may specify one or more network locations (e.g., universal resource locater) that are accessed by the receiving device in response to user interaction with object 500. For example, the receiving device may inform a different network location for each different paradigm (e.g., gaze, hand gesture, voice command) of user interaction at various levels of granularity as described above. In some examples, at least a portion of the data described herein associated with object 500 may be associated with a slot for the object.

Figure 6:
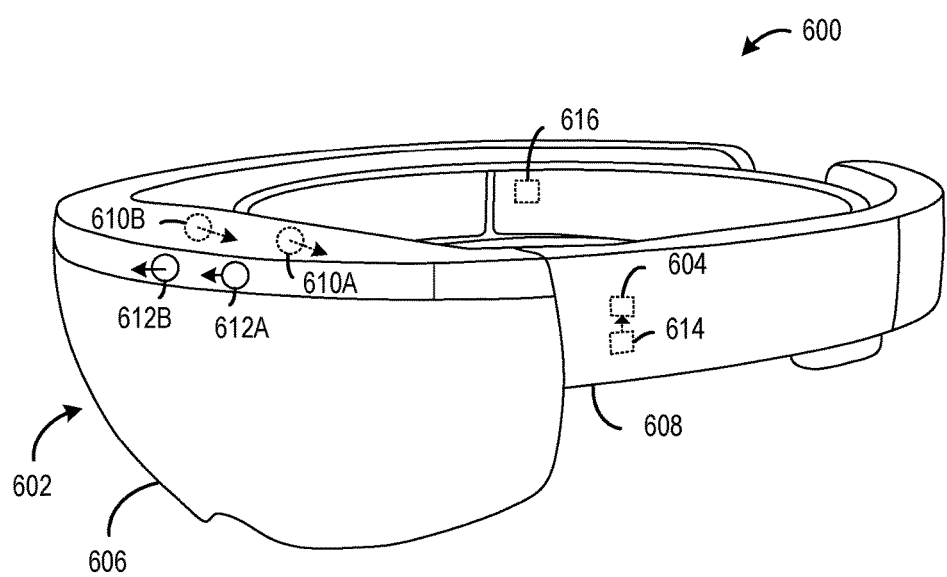
FIG. 6 shows aspects of an example computing system.

FIG. 6 shows aspects of an example computing system 600 including a near-eye display 602. The computing system 600 is a non-limiting example of HMD device 104, and may be used for sending requests to fill third-party object slots and to display third-party objects. Computing system 600 may be implemented as computing system 800 shown in FIG. 8.

Computing system 600 may be configured to present any suitable type of virtual imagery experience. In some implementations, the experience includes a totally virtual experience in which the near-eye display 602 is opaque, such that the wearer is completely immersed in virtual-reality imagery provided via the near-eye display 602. In other implementations, the experience takes the form of a mixed-reality experience in which the near-eye display 602 is wholly or partially transparent from the perspective of the wearer, to give the wearer a view of the surrounding real-world physical space. The near-eye display 602 may direct display light to the user's eye(s) while light from the physical space passes through the near-eye display 602 to the user's eye(s). As such, the user's eye(s) simultaneously receive light from the physical environment and display light.

In such augmented-reality (or mixed reality) implementations, the computing system 600 may be configured to visually present augmented-reality objects that appear display-locked and/or world-locked. A display-locked augmented-reality object may appear to move along with a perspective of the user as a pose (e.g., six degrees of freedom (DOF): x, y, z, yaw, pitch, roll) of the computing system 600 changes. As such, a display-locked, augmented-reality object may appear to occupy the same portion of the near-eye display 602 and may appear to be at the same distance from the user, even as the user moves in the physical space. A world-locked, augmented-reality object may appear to remain in a fixed location in the physical space, even as the pose of the computing system 600 changes. In some examples, a world-locked object may appear to move in correspondence with movement of a real, physical object. In yet other examples, a virtual object may be displayed as body-locked, in which the object is located to an estimated pose of a user's body.

In some implementations, the opacity of the near-eye display 602 is controllable dynamically via a dimming filter. A substantially see-through display, accordingly, may be switched to full opacity for a fully immersive virtual-reality experience.

The computing system 600 may take any other suitable form in which a transparent, semi-transparent, and/or non-transparent display is supported in front of a viewer's eye(s). Further, implementations described herein may be used with any other suitable computing device, including but not limited to wearable computing devices, mobile computing devices, laptop computers, desktop computers, smart phones, tablet computers, etc.

Any suitable mechanism may be used to display images via the near-eye display 602. For example, the near-eye display 602 may include image-producing elements located within lenses 606. As another example, the near-eye display 602 may include a display device, such as a liquid crystal on silicon (LCOS) device or organic light-emitting diode (OLED) microdisplay located within a frame 608. In this example, the lenses 606 may serve as, or otherwise include, a light guide for delivering light from the display device to the eyes of a wearer. Additionally or alternatively, the near-eye display 602 may present left-eye and right-eye mixed-reality images via respective left-eye and right-eye displays.

The computing system 600 includes an on-board computer 604 configured to perform various operations related to receiving user input (e.g., gesture recognition, eye gaze detection), visual presentation of mixed-reality images on the near-eye display 602, and other operations described herein. In some implementations, some to all of the computing functions described above, may be performed off board. Computer 604 may implement portions, or the entirety, of computing system 800 of FIG. 8, for example.

The computing system 600 may include various sensors and related systems to provide information to the on-board computer 604. Such sensors may include, but are not limited to, one or more inward facing image sensors 610A and 610B, one or more outward facing image sensors 612A and 612B, an inertial measurement unit (IMU) 614, and one or more microphones 616. The one or more inward facing image sensors 610A, 610B may be configured to acquire gaze tracking information from a wearer's eyes (e.g., sensor 610A may acquire image data for one of the wearer's eye and sensor 610B may acquire image data for the other of the wearer's eye). One or more such sensors may be used to implement a sensor system of HMD device 104, for example.

Where gaze-tracking sensors are included, the on-board computer 604 may be configured to determine gaze directions of each of a wearer's eyes in any suitable manner based on the information received from the image sensors 610A, 610B. The one or more inward facing image sensors 610A, 610B, and the on-board computer 604 may collectively represent a gaze detection machine configured to determine a wearer's gaze target on the near-eye display 602. In other implementations, a different type of gaze detector/sensor may be employed to measure one or more gaze parameters of the user's eyes. Examples of gaze parameters measured by one or more gaze sensors that may be used by the on-board computer 604 to determine an eye gaze sample may include an eye gaze direction, head orientation, eye gaze velocity, eye gaze acceleration, change in angle of eye gaze direction, and/or any other suitable tracking information. In some implementations, eye gaze tracking may be recorded independently for both eyes.

The one or more outward facing image sensors 612A, 612B may be configured to measure physical environment attributes of a physical space. In one example, image sensor 612A may include one or more visible-light cameras (e.g. a stereo camera arrangement) configured to collect a visible-light image of a physical space. Additionally or alternatively, the image sensor 612B may include a depth camera configured to collect a depth image of a physical space. More particularly, in one example, the depth camera is an infrared time-of-flight depth camera. In another example, the depth camera is an infrared structured light depth camera.

Data from the outward facing image sensors 612A, 612B may be used by the on-board computer 604 to detect movements, such as gesture-based inputs or other movements performed by a wearer or by a person or physical object in the physical space. In one example, data from the outward facing image sensors 612A, 612B may be used to detect a wearer input performed by the wearer of the computing system 600, such as a gesture. Data from the outward facing image sensors 612A, 612B may be used by the on-board computer 604 to determine direction/location and orientation data (e.g., from imaging environmental features) that enables position/motion tracking of the computing system 600 in the real-world environment. In some implementations, data from the outward facing image sensors 612A, 612B may be used by the on-board computer 604 to construct still images and/or video images of the surrounding environment from the perspective of the computing system 600.

The IMU 614 may be configured to provide position and/or orientation data of the computing system 600 to the on-board computer 604. In one implementation, the IMU 614 may be configured as a three-axis or three-degree of freedom (3DOF) position sensor system. This example position sensor system may, for example, include three gyroscopes to indicate or measure a change in orientation of the computing system 600 within 3D space about three orthogonal axes (e.g., roll, pitch, and yaw).

In another example, the IMU 614 may be configured as a six-axis or six-degree of freedom (6DOF) position sensor system. Such a configuration may include three accelerometers and three gyroscopes to indicate or measure a change in location of the computing system 600 along three orthogonal spatial axes (e.g., x, y, and z) and a change in device orientation about three orthogonal rotation axes (e.g., yaw, pitch, and roll). In some implementations, position and orientation data from the outward facing image sensors 612A, 612B and the IMU 614 may be used in conjunction to determine a position and orientation (or 6DOF pose) of the computing system 600.

The computing system 600 may also support other suitable positioning techniques, such as GPS or other global navigation systems. Further, while specific examples of position sensor systems have been described, it will be appreciated that any other suitable sensor systems may be used. For example, head pose and/or movement data may be determined based on sensor information from any combination of sensors mounted on the wearer and/or external to the wearer including, but not limited to, any number of gyroscopes, accelerometers, inertial measurement units, GPS devices, barometers, magnetometers, cameras (e.g., visible light cameras, infrared light cameras, time-of-flight depth cameras, structured light depth cameras, etc.), communication devices (e.g., WIFI antennas/interfaces), etc.

The one or more microphones 616 may be configured to measure sound in the physical space. Data from the one or more microphones 616 may be used by the on-board computer 604 to recognize voice commands provided by the wearer to control the computing system 600.

The on-board computer 604 may include a logic device and a storage device, discussed in more detail below with respect to FIG. 8, in communication with the near-eye display 602 and the various sensors of the computing system 600.

Figure 7:
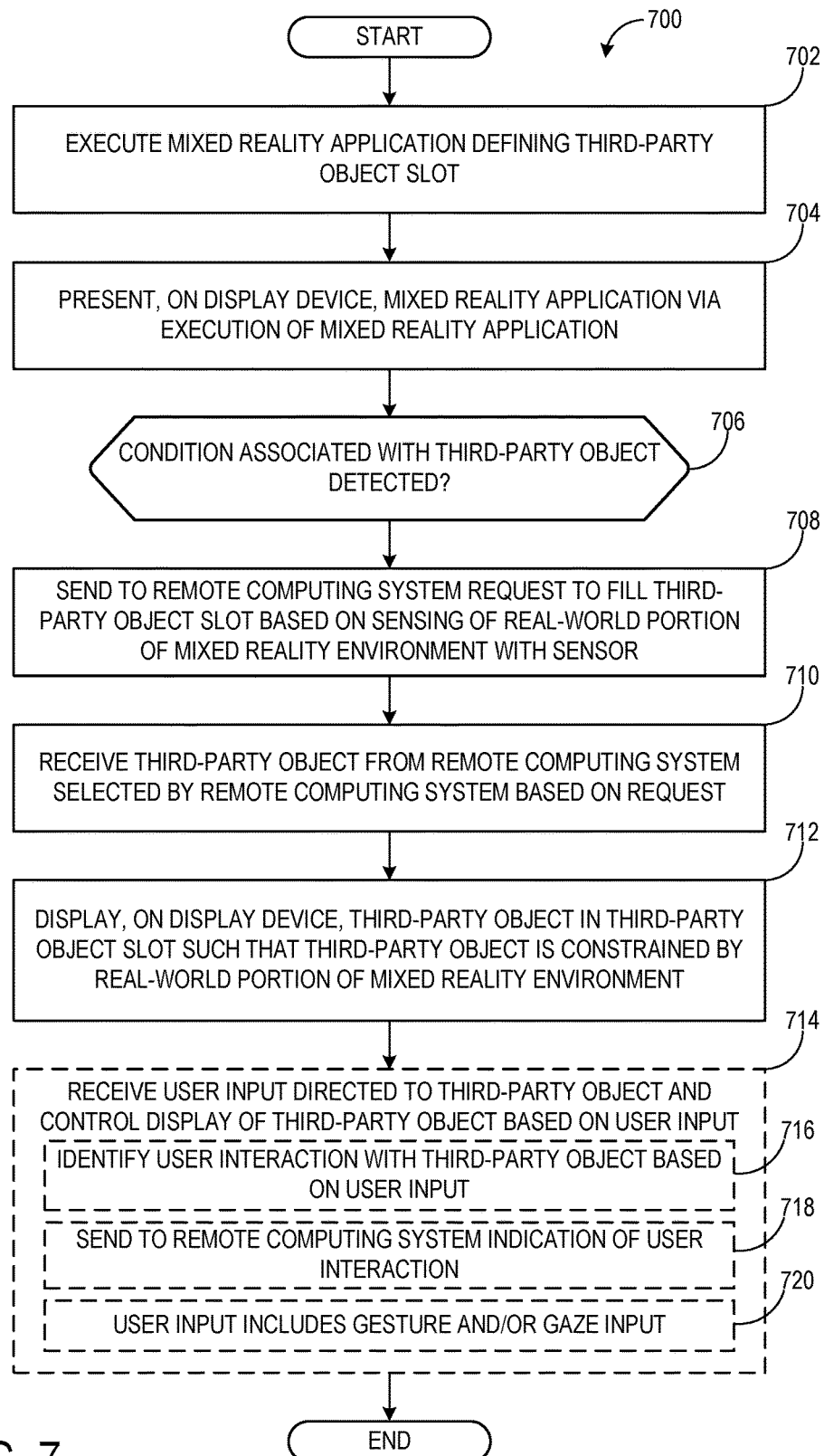
FIG. 7 shows a flowchart illustrating an example method of displaying a third-party object constrained by a real-world portion of a mixed reality environment.

FIG. 7 shows a flowchart illustrating an example method 700 of displaying a third-party object constrained by a real-world portion of a mixed reality environment. Method 700 may be implemented on HMD device 104 and/or computing system 600, as examples.

At 702, method 700 includes executing a mixed reality application, the mixed reality application defining a third-party object slot.

At 704, method 700 includes presenting, on a display device, a mixed reality environment via execution of the mixed reality application.

At 706, method 700 includes determining whether a condition associated with the third-party object slot is detected. If the condition is not detected (NO), method 700 returns to 706. If the condition is detected (YES), method 700 proceeds to 708. In some examples, the condition may be defined by the mixed reality application and triggered by user interaction with the mixed reality application.

At 708, method 700 includes, upon detecting a condition associated with the third-party object slot, sending to a remote computing system a request to fill the third-party object slot, the request based on sensing of a real-world portion of the mixed reality environment with a sensor of a computing device. In some examples, the request may specify a type of physical feature associated with the third-party object slot. In some examples, the real-word portion may include a physical feature, and the request may include data regarding one or more physical parameters of the physical feature. In some examples, sensing the real-world portion may include determining an identity of the real-world portion. In some examples, sensing the real-world portion may include determining one or both of a location and orientation of the computing device, and the third-party object may be selected by the remote computing system based on such location/orientation. In some examples, sensing the real-world portion may include determining a local time of the computing device, and the third-p arty object may be selected by the remote computing system based on the local time. In some examples, sensing the real-world portion may include determining one or more lighting conditions local to the computing device, and the third-party object may be selected by the remote computing system based on the one or more lighting conditions. In some examples, sensing the real-world portion may include determining one or more weather conditions local to the computing device, and the third-party object may be selected by the remote computing system based on the one or more weather conditions. In some examples, the request may be based further on sensing data corresponding to a user of the computing device, and the third-party object may be selected by the remote computing system based on the data.

At 710, method 700 includes receiving a third-party object from the remote computing system, the third-party object selected by the remote computing system based on the request.

At 712, method 700 includes displaying, on the display device, the third-party object in the third-party object slot such that the third-party object is constrained by a real-world portion of the mixed reality environment. While not shown in FIG. 7, method 700 may optionally include displaying the third-party object as physically interacting with gravity and one or more physical surfaces associated with the real-world portion.

At 714, method 700 may optionally include receiving a user input directed to the third-party object and controlling the display of the third-party object based on the user input. At 716, method 700 may optionally include identifying a user interaction with the third-party object based on the user input. At 718, method 700 may optionally include sending to the remote computing system an indication of the user interaction, where the remote computing system may select a future third-party object based on the indication. As indicated at 720, the user input may include one or both of a gesture input and a gaze input.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
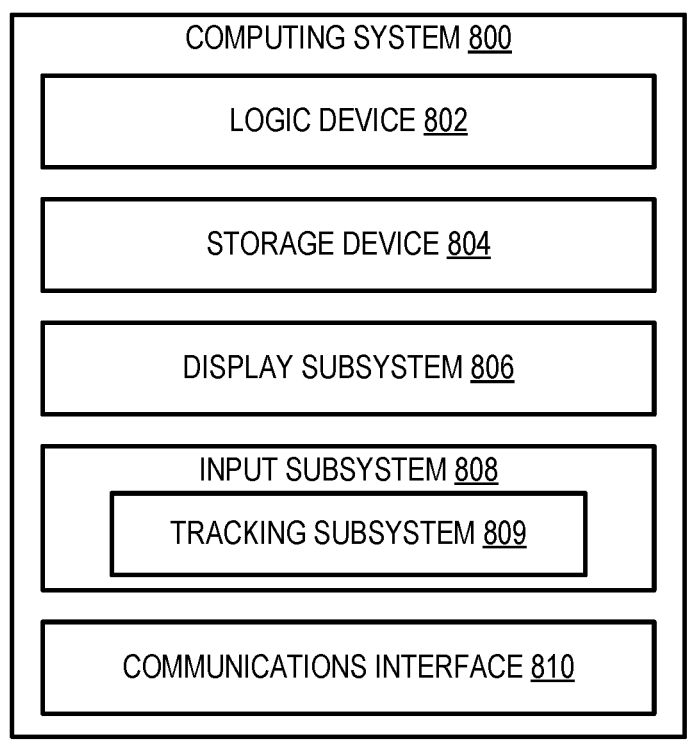
FIG. 8 schematically shows another example computing system.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic machine 802 and a storage machine 804. Computing system 800 may optionally include a display subsystem 806, input subsystem 808, communication subsystem 810, and/or other components not shown in FIG. 8.

Logic machine 802 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 804 includes one or more physical devices configured to hold instructions executable by the logic machine to implement the methods and processes described herein. When such methods and processes are implemented, the state of storage machine 804 may be transformed—e.g., to hold different data.

Storage machine 804 may include removable and/or built-in devices. Storage machine 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 804 may include volatile, nonvolatile, dynamic, static, read/write, read-only, random-access, sequential-access, location-addressable, file-addressable, and/or content-addressable devices.

It will be appreciated that storage machine 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 802 and storage machine 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of Computing system 800 implemented to perform a particular function. In some cases, a module, program, or engine may be instantiated via logic machine 802 executing instructions held by storage machine 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage machine 804. This visual representation may take the form of a graphical user interface (GUI). As the herein described methods and processes change the data held by the storage machine, and thus transform the state of the storage machine, the state of display subsystem 806 may likewise be transformed to visually represent changes in the underlying data. Display subsystem 806 may include one or more display devices utilizing virtually any type of technology. Such display devices may be combined with logic machine 802 and/or storage machine 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity. To this end, FIG. 8 shows the optional inclusion of a tracking subsystem 809 as part of input subsystem 808. Tracking subsystem 809 may include any suitable components for receiving NUI and generally tracking user(s), such as a gaze-tracking machine (e.g., including one or more inward-facing gaze sensors), and/or a gesture-tracking machine (e.g., including one or more outward-facing image sensors for tracking hand gestures).

When included, communication subsystem 810 may be configured to communicatively couple Computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow Computing system 800 to send and/or receive messages to and/or from other devices via a network such as the Internet.

Another example provides a computing device comprising a logic machine, and a storage machine holding instructions executable by the logic machine to execute a mixed reality application, the mixed reality application defining a third-party object slot, present, on a display device, a mixed reality environment via execution of the mixed reality application, upon detecting a condition associated with the third-party object slot, send to a remote computing system a request to fill the third-party object slot, the request based on sensing of a real-world portion of the mixed reality environment with a sensor of the computing device, receive a third-party object from the remote computing system, the third-party object selected by the remote computing system based on the request, and display, on the display device, the third-party object in the third-party object slot such that the third-party object is constrained by a real-world portion of the mixed reality environment. In such an example, the request may alternatively or additionally specify a type of physical feature associated with the third-party object slot. In such an example, the real-word portion may include a physical feature, and the request may alternatively or additionally include data regarding one or more physical parameters of the physical feature. In such an example, the instructions executable to sense a real-world portion may alternatively or additionally be executable to determine an identity of the real-world portion. In such an example, the condition may alternatively or additionally be defined by the mixed reality application and triggered by user interaction with the mixed reality application. In such an example, the instructions executable to sense a real-world portion may alternatively or additionally be executable to determine one or both of a location and orientation of the computing device, and the third-party object may be alternatively or additionally selected by the remote computing system based on such location/orientation. In such an example, the instructions executable to sense a real-world portion may alternatively or additionally be executable to determine a local time of the computing device, and the third-party object may be alternatively or additionally selected by the remote computing system based on the local time. In such an example, the instructions executable to sense a real-world portion may alternatively or additionally be executable to determine one or more lighting conditions local to the computing device, and the third-party object may alternatively or additionally be selected by the remote computing system based on the one or more lighting conditions. In such an example, the instructions executable to sense a real-world portion may be alternatively or additionally executable to determine one or more weather conditions local to the computing device, and the third-party object may be alternatively or additionally selected by the remote computing system based on the one or more weather conditions. In such an example, the request may be alternatively or additionally based on sensing data corresponding to a user of the computing device, and the third-party object may be alternatively or additionally selected by the remote computing system based on the data. In such an example, the instructions executable to display the third-party object as constrained by a real-world portion may be alternatively or additionally executable to display the third-party object as physically interacting with gravity and one or more physical surfaces associated with the real-world portion. In such an example, the instructions may be alternatively or additionally executable to receive a user input directed to the third-party object and control the display of the third-party object based on the user input. In such an example, the instructions may be alternatively or additionally executable to identify a user interaction with the third-party object based on the user input. In such an example, the instructions may be alternatively or additionally executable to send to the remote computing system an indication of the user interaction, and the remote computing system may be alternatively or additionally configured to select a future third-party object based on the indication. In such an example, the user input may include one or both of a gesture input and a gaze input.

Another example provides a method, comprising executing a mixed reality application, the mixed reality application defining a third-party object slot, presenting, on a display device, a mixed reality environment via execution of the mixed reality application, upon detecting a condition associated with the third-party object slot, sending to a remote computing system a request to fill the third-party object slot, the request based on sensing of a real-world portion of the mixed reality environment with a sensor of the computing device, receiving a third-party object from the remote computing system, the third-party object selected by the remote computing system based on the request, and displaying, on the display device, the third-party object in the third-party object slot such that the third-party object is constrained by a real-world portion of the mixed reality environment. In such an example, the third-party object may be alternatively or additionally displayed as physically interacting with gravity and one or more physical surfaces associated with the real-world portion. In such an example, the real-word portion may include a physical feature, and the request may alternatively or additionally include data regarding one or more physical parameters of the physical feature.

Another example provides a head-mounted display device, comprising a display device, one or more sensors, a logic machine, and a storage machine holding instructions executable by the logic machine to execute a mixed reality application, the mixed reality application defining a third-party object slot, present, on the display device, a mixed reality environment via execution of the mixed reality application, upon detecting a condition associated with the third-party object slot, send to a remote computing system a request to fill the third-party object slot, the request based on sensing of a real-world portion of the mixed reality environment with the one or more sensors, receive a third-party object from the remote computing system, the third-party object selected by the remote computing system based on the request, and display, on the display device, the third-party object in the third-party object slot such that the third-party object is constrained by a real-world portion of the mixed reality environment. In such an example, the instructions executable to display the third-party object as constrained by a real-world portion may be alternatively or additionally executable to display the third-party object as physically interacting with gravity and one or more physical surfaces associated with the real-world portion.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a logic machine; and
a storage machine holding instructions executable by the logic machine to:
execute a mixed reality application, the mixed reality application defining a third-party object slot;
present, on a display device, a mixed reality environment via execution of the mixed reality application;
upon detecting a condition associated with the third-party object slot, send to a remote computing system a request to fill the third-party object slot, the request based on sensing of a real-world portion of the mixed reality environment with a sensor of the computing device;
receive a third-party object from the remote computing system, the third-party object selected by the remote computing system based on the request; and
display, on the display device, the third-party object in the third-party object slot such that the third-party object is constrained by a real-world portion of the mixed reality environment.

2. The computing device of claim 1, where the request specifies a type of physical feature associated with the third-party object slot.

3. The computing device of claim 1, where the real-word portion includes a physical feature, and where the request includes data regarding one or more physical parameters of the physical feature.

4. The computing device of claim 1, where the instructions executable to sense a real-world portion are executable to determine an identity of the real-world portion.

5. The computing device of claim 1, where the condition is defined by the mixed reality application and is triggered by user interaction with the mixed reality application.

6. The computing device of claim 1, where the instructions executable to sense a real-world portion are executable to determine one or both of a location and orientation of the computing device, and where the third-party object is selected by the remote computing system based on such location/orientation.

7. The computing device of claim 1, where the instructions executable to sense a real-world portion are executable to determine a local time of the computing device, and where the third-party object is selected by the remote computing system based on the local time.

8. The computing device of claim 1, where the instructions executable to sense a real-world portion are executable to determine one or more lighting conditions local to the computing device, and where the third-party object is selected by the remote computing system based on the one or more lighting conditions.

9. The computing device of claim 1, where the instructions executable to sense a real-world portion are executable to determine one or more weather conditions local to the computing device, and where the third-party object is selected by the remote computing system based on the one or more weather conditions.

10. The computing device of claim 1, where the request is based further on sensing data corresponding to a user of the computing device, and where the third-party object is selected by the remote computing system based on the data.

11. The computing device of claim 1, where the instructions executable to display the third-party object as constrained by a real-world portion are executable to display the third-party object as physically interacting with gravity and one or more physical surfaces associated with the real-world portion.

12. The computing device of claim 1, where the instructions are further executable to receive a user input directed to the third-party object and control the display of the third-party object based on the user input.

13. The computing device of claim 12, where the instructions are further executable to identify a user interaction with the third-party object based on the user input.

14. The computing device of claim 13, where the instructions are further executable to send to the remote computing system an indication of the user interaction, and where the remote computing system is configured to select a future third-party object based on the indication.

15. The computing device of claim 12, where the user input includes one or both of a gesture input and a gaze input.

16. A method, comprising:
   executing a mixed reality application, the mixed reality application defining a third-party object slot;
   presenting, on a display device, a mixed reality environment via execution of the mixed reality application;
   upon detecting a condition associated with the third-party object slot, sending to a remote computing system a request to fill the third-party object slot, the request based on sensing of a real-world portion of the mixed reality environment with a sensor of the computing device;
   receiving a third-party object from the remote computing system, the third-party object selected by the remote computing system based on the request; and
   displaying, on the display device, the third-party object in the third-party object slot such that the third-party object is constrained by a real-world portion of the mixed reality environment.

17. The method of claim 16, where the third-party object is displayed as physically interacting with gravity and one or more physical surfaces associated with the real-world portion.

18. The method of claim 16, where the real-word portion includes a physical feature, and where the request includes data regarding one or more physical parameters of the physical feature.

19. A head-mounted display device, comprising:
   a display device;
   one or more sensors;
   a logic machine; and
   a storage machine holding instructions executable by the logic machine to:
      execute a mixed reality application, the mixed reality application defining a third-party object slot;
      present, on the display device, a mixed reality environment via execution of the mixed reality application;
      upon detecting a condition associated with the third-party object slot, send to a remote computing system a request to fill the third-party object slot, the request based on sensing of a real-world portion of the mixed reality environment with the one or more sensors;
      receive a third-party object from the remote computing system, the third-party object selected by the remote computing system based on the request; and
      display, on the display device, the third-party object in the third-party object slot such that the third-party object is constrained by a real-world portion of the mixed reality environment.

20. The head-mounted display device of claim 19, where the instructions executable to display the third-party object as constrained by a real-world portion are executable to display the third-party object as physically interacting with gravity and one or more physical surfaces associated with the real-world portion.

* * * * *